R. H. J. GJETTING.
MILKING MACHINE.
APPLICATION FILED SEPT. 21, 1911.
1,018,610.
Patented Feb. 27, 1912.
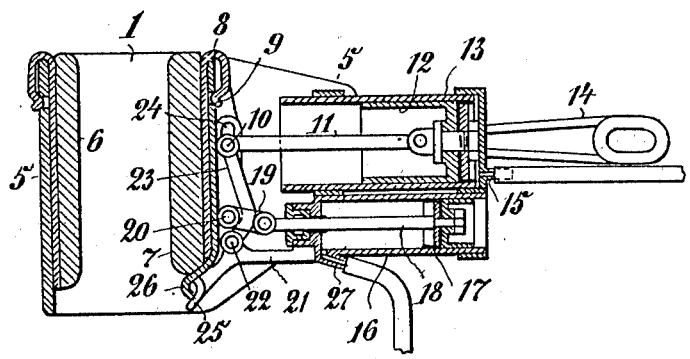
Witnesses
Inventor
Regner H. J. Gjetting

UNITED STATES PATENT OFFICE.

REGNER HENRY JULIUS GJETTING, OF COPENHAGEN, DENMARK.

MILKING-MACHINE.

1,018,610.  Specification of Letters Patent.  Patented Feb. 27, 1912.

Application filed September 21, 1911. Serial No. 650,585.

*To all whom it may concern:*

Be it known that I, REGNER H. J. GJETTING, a subject of the King of Denmark, residing at Ribegade 15, Copenhagen, Denmark, have invented new and useful Improvements in Milking-Machines, of which the following is a specification.

The invention relates to a milking machine of the kind, in which a movable flap moves toward the fixed flap in such a manner, as to first close the teat at the root and then press downwardly along the teat in order to thereby press out the milk, and the invention consists in the movable flap—besides being acted upon by the known pulsating piston—being also acted upon by another piston which is under constant pressure.

The invention is schematically shown in the drawing in partial section.

The milking-device consists of a celluloid-casing 5 with a fixed flap 6 and a movable flap 7, the back 8 of this movable flap being provided with two side-flanges 9, in which are formed bearings for the bolt 10 to which the piston-rod 11 is pivoted. The piston-rod 11 is pivotally connected to the plunger 12 slidable in the cylinder 13, which latter is open at front and the rear head of which is provided with a carrying device 14 and a channel 15, through which pulsating compressed air is led in behind the plunger 12. The cylinder 13, hereinafter called the pulsation-cylinder, is fastened to the celluloid-casing 5. Under the cylinder 13, another cylinder 16 is provided, which is open at the rear the pressure-cylinder, in which slides a piston 17, the piston-rod 18 of which, through a link 19 is pivotally connected with the bolt 20. This bolt likewise has its bearings in the flanges 9. Compressed air is led to the pressure-cylinder through the channel 27. In connection with the pressure-cylinder is provided, at the lower part thereof, a protruding frame-piece 21, having at its top, a cross-arm 22, on which turn two upwardly directed arms 23. These arms at their upper ends terminate in closed slots 24 receiving the bolt 10, and in which it can slide. The part 21 ends below in a hook-shaped piece 25, into which a similar hook-shaped piece 26 at foot of the back 8 of the movable flap can catch, when the flap is in the position shown in the drawing.

When the device is to start working the pistons are normally in the position shown in the drawing. Compressed air being led into the pressure-cylinder 16, and thereupon into the pulsation-cylinder 13, the plunger 12 will move forward, thereby pushing the flap 7 forward, turning around the hooking-line between the hooks 25 and 26, until the uppermost edge of the flap has squeezed together the teat at the root. During this movement the arms 23 turn forwardly on the bolt 22, the bolt 10 slides upwardly in the slots 24, and ultimately reaches the upper edge of the slots, thereby preventing the flap from being displaced upwardly and thus limiting movement of the flap during a succeeding part of its stroke. The plunger 12 continuing its forward movement, the flap 7 will swing on its contingent line with the teat, however, not until the pressure at the root of the teat is great enough to prevent the milk from entering into the udder, which pressure is adjusted by giving the plunger an area adapted for this purpose. During this swinging movement the milk is pressed out.

Owing to the effect of the slot 24—provided the slot has the right length—the flap will be drawn slightly downwardly. As during this movement the pressure in the cylinder 16 has to be overcome, the pressure on the plunger 12 must of course be equal to the pressure necessary for the movement of the flap augmented with the pressure on the piston 17 of the pressure-cylinder 16, wherefore the plunger 12 has a considerably greater area than the piston 17, both of them being acted upon by the same pressure. When the swinging is completed, the space behind the plunger 12 in the pulsation-cylinder 13 is put into connection with the atmosphere, so that the piston 17, which is constantly under pressure, can draw back the flap 7. The bolt 10 will, during this movement, rest on the lowermost limit of the slots 24 preventing the displacement of hook-shaped piece 26 with respect to hook-shaped piece 25, by retaining the flap against downward movement. In order to attain the effect described all of the pulsation-cylinders and pressure-cylinders are put into connection with a pulsator with a cock specially constructed for this purpose.

Having now described my invention what I claim and desire to secure by Letters Patent of U. S. A. is:

1. A milking machine comprising in combination, a flap, a second flap movable with respect thereto, yieldable means for normally retaining said flaps in spaced apart relation to each other a predetermined distance, and mechanism for imparting a forward and downward movement to said second mentioned flap, with respect to said first mentioned flap, subject to return movement thereof responsive to said yieldable means.

2. A milking machine comprising in combination, a flap, a second flap movable with respect thereto, means mounting said second mentioned flap permitting oscillation and reciprocation thereof, a cylinder adapted to confine fluid pressure, a piston within said cylinder, means operatively connecting said piston and second mentioned flap to normally draw the same away from said first mentioned flap responsive to fluid expansion within said cylinder, and mechanism for imparting a forward and downward movement to said second mentioned flap, with respect to said first mentioned flap, subject to return movement thereof responsive to action of the fluid pressure within said cylinder.

3. A milking machine comprising in combination, a stationary structure provided with a flap and a bearing surface oppositely disposed with respect thereto, a second flap provided with a gib coacting with the said bearing surface of said first mentioned flap, for oscillatably and reciprocatably mounting the same in operative relation to said first mentioned flap, a cylinder, piston within said cylinder, means operatively connecting said piston and second mentioned flap for actuating the same, a device coacting with said second mentioned flap to guide the same during a part of its stroke in a predetermined path of movement with respect to said first mentioned flap responsive to action of said piston, a second cylinder, a second piston within said second cylinder, the said second mentioned cylinder being provided with a working space substantially smaller than that of said first mentioned cylinder, means operatively connecting said second mentioned piston and second mentioned flap to draw the same away from said first mentioned flap, and means for conveying fluid pressure within said cylinders to impart a forward movement and downward movement to said second mentioned flap subject to action of said first mentioned piston responsive to fluid expansion, and return movement thereof, under the action of said second mentioned piston responsive to fluid expansion.

In testimony whereof I have affixed my signature in presence of two witnesses.

REGNER HENRY JULIUS GJETTING.

Witnesses:
F. PETERSEN,
W. SLETTING